Oct. 23, 1923.
C. A. SENTOU ET AL
1,471,864
SCRAPING MACHINE
Filed Feb. 28, 1922
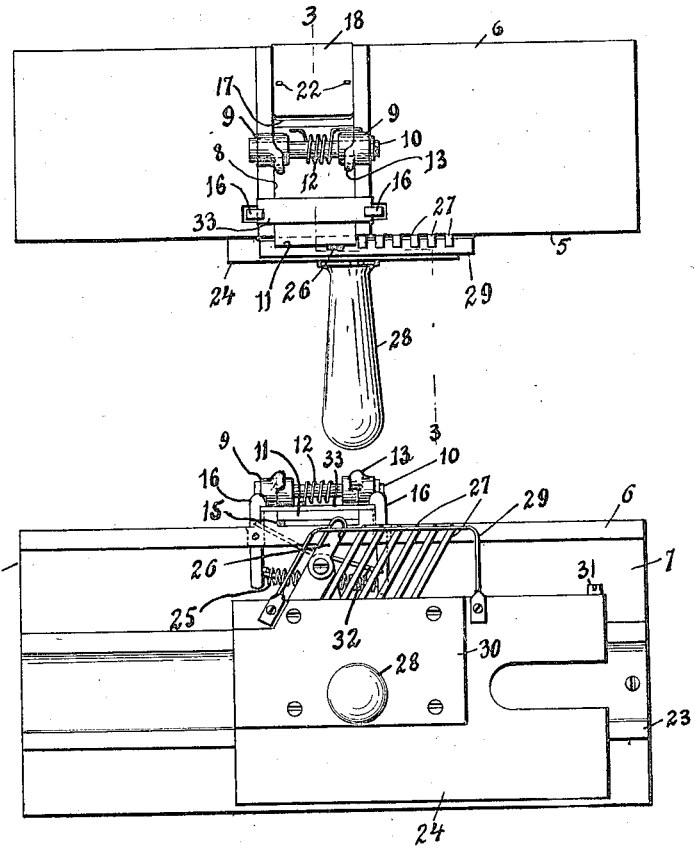
Fig.1.
Fig.2.
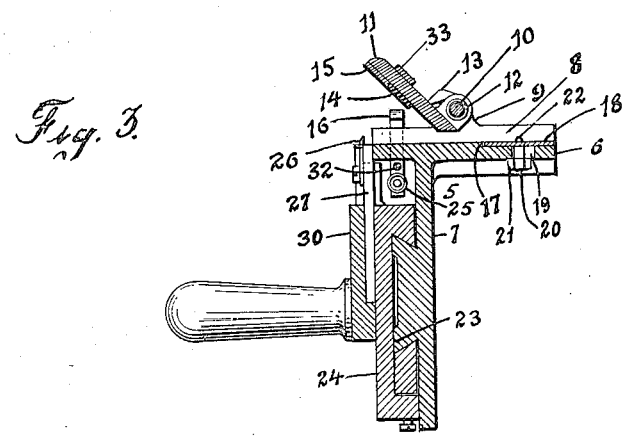
Fig.3.
INVENTORS
C.A. SENTOU.
E. JACQUET.
BY
ATTORNEY Patented Oct. 23, 1923.

1,471,864

UNITED STATES PATENT OFFICE.

CAMILLE A. SENTOU AND ETIENNE JACQUET, OF FORT LEE, NEW JERSEY, ASSIGNORS, BY MESNE ASSIGNMENTS, TO EASTMAN KODAK COMPANY, OF ROCHESTER, NEW YORK, A CORPORATION OF NEW YORK.

SCRAPING MACHINE.

Application filed February 28, 1922. Serial No. 540,067.

*To all whom it may concern:*

We, CAMILLE A. SENTOU and ETIENNE JACQUET, both citizens of the Republic of France, and residents of Fort Lee, county of Bergen and State of New Jersey, have invented a new and Improved Scraping Machine, of which the following is a full, clear, and exact description.

Our invention relates to a device for scraping off the emulsion of a film for properly cementing the film and it has reference more particularly to a machine which would square the edges of a film and scrape the emulsion evenly from the celluloid support without materially diminishing the thickness of the celluloid support.

It is very important that all of the emulsion should be scraped off from the celluloid support where the joint is to be made for obtaining a proper joint in cementing the ends of films and it is also desirable to scrape the emulsion off so that the support remains of uniform thickness where the emulsion has been scraped off so as not to weaken any part of the celluloid support where the emulsion has been removed.

With the aforementioned purposes in view, we have produced a machine which will automatically square the edges of the film and scrape the emulsion.

The machine is characterized by the provision of a support for retaining the film and a carrier provided with the cutting and scraping devices, and means associated with the carrier and the support for automatically releasing the film from the support after the same has been squared and scraped.

In the accompanying drawing forming part of the specification, Figure 1 is a plan view of the scraping machine embodying our invention, Figure 2 is an elevation of the machine and Figure 3 is a vertical section of the machine on line 3—3, Figure 1.

Referring to the drawing the support 5, in the shape of an angle plate, presents a table 6 and a depending frame portion 7. The table 6 has a channel 8 running transversely of the table and disposed substantially in the middle of same. The walls of the channel 8 are provided midway with lugs 9 which carry a pin 10, forming the hinge for a trap 11. The trap extends out of the channel 8 above the depending portion 7 of the support. The hinge of the trap is provided with a spring 12 tending to raise the trap from the bottom of the channel. The motion of the trap on its spring hinge is limited by a stop 13 formed on the lugs 9. The trap 11 is provided with a soft pad 14 and a hard pad 15 which are adapted to engage the film when same is placed into the channel 8 and the trap is pressed downwardly, thereby locking the film to the bottom of the channel. The trap 11 is retained in the depressed position by spring actuated pawls 16 mounted in the support 5, the spring 25 tending to move the pawls in engagement with the trap 11.

The bottom of the channel 8 has a recess 17 and a slot 19, designed to accommodate respectively a plate 18 and a threaded stem 20 extending from the plate 18. A suitable nut 21 is provided on the stem whereby the plate 18 may be locked in the recess of the channel 8 in different adjusted positions. The plate has two or more teeth 22 which are designed to engage the perforations of a film when the same is slipped into the channel 8. The adjustment of the plate 18 in its recess permits the squaring of the film at any desired point between the perforations.

The depending frame portion 7 has a longitudinal track 23 on which a slide 24 is provided. The slide forms a carrier for a knife 26 which will cut the film along the outer edge of the pad 15 provided on the trap 11, when said trap is in the bottom of the channel 8. The slide carries also a series of scrapers 27 which follow the knife 26 when a film is to be cut and scraped. The scrapers are made so that they yield or flex when scraping the film. The said aligning series of scrapers 27 are set inwardly of the knife 26 to scrape off the emulsion of the film which will come in contact with the said scrapers when the slide 24 is moved along the track by means of a handle 28. The scrapers 27 are placed at an angle to flex away from the film as they scrape the emulsion off the film. The contact of the scrapers with the emulsion forces the film against the pad 15 which forms the support for the film while the same is being cut and scraped.

The series of scrapers 27 are set so that each scraper will successively take off the emulsion from the film. In other words, each scraper takes off only a portion of the thickness of the emulsion and the last scraper will only react upon the celluloid body which supports the emulsion, thereby leaving the same free of any emulsion thereon to present a clean surface for cementing the ends of the film.

The reason for providing a series of scrapers is that it is impossible to obtain a scraping member which will not dull rapidly from contact with celluloid, and by making each scraper do a little of the work necessary for scraping off the emulsion, the series of scrapers can be used for a long period of time without the necessity of resharpening the same. The knife and scrapers are provided with a guard 29. The retaining plate 30 which locks the scrapers into the slide 24 may be provided with means for adjusting the scrapers for properly performing their work, but this not forming part of the invention, is not shown.

One of the spring actuated pawls 16 is adapted to come into engagement with a stud 31, provided on the slide 24 when said slide is moved to scrape the film. This stud is so placed that it engages the pawl after the film is scraped. This engagement of the pawl with the stud is transmitted to the other pawl by means of a rod 32 causing the said pawls to disengage the plate 33 of the trap which permits the spring hinge of the trap to raise the same from the channel 8 and the squared and scraped film can then be removed from the said channel 8.

With the trap out of the channel the slide can be returned to operative position without the scraper coming into contact with the hard pad 15 of the trap 11 and thereby eliminates any injury to said scrapers and knife when there is no film in the channel 8.

The film is generally introduced from the rear of the table 6 as the trap 11 is so designed that when it is in raised position there is sufficient clearance to easily pass the film to the front or operative end of the table.

We claim:

1. A film squaring and scraping machine comprising a support having a channel for accommodating a film, a trap for engaging the film in to the channel, spring actuated means for locking the trap in the channel, a slide on the support disposed to move transversely of the channel, a cutter on the slide for cutting the film in the channel, a series of scrapers disposed on the slide for engaging the film successively so that the said film is supported by the trap, said scrapers being disposed obliquely so as to flex away from the film when engaging the film, means carried by the slide and adapted to engage the spring actuated means for locking the trap in the channel, and whereby said spring actuated means are adapted to disengage the trap, the said trap having means for raising it from the channel, substantially as and for the purposes set forth.

2. A film squaring and scraping machine comprising a support having a channel adapted to receive the film, adjustable means in said channel for engaging the perforations of a film, a spring actuated trap disposed to engage the film in the channel, said trap being adapted to extend out of the channel, spring actuated pawls in the channel for engaging the trap and locking the same in the channel, said spring actuated trap normally tending to move out of the channel, a slide on the support adapted to move transversely of the channel, a cutter on the slide adapted to cut the film on the end of the trap extending out of the channel, a series of yielding scrapers disposed in alignment and obliquely in the support and adapted to engage the film so that the same bears against the trap and means on the slide for engaging the spring actuated pawls so as to release the trap from the channel.

3. A film squaring and scraping machine comprising a support means for cutting off a film transversely of its length, and a row of scrapers having their cutting edges disposed so that each scraper surfaces a little deeper than the preceding.

4. A film squaring and scraping machine comprising a film support means for cutting off a film transversely of its length, and a row of aligning scrapers disposed to pass over the same surface of the film with their cutting edges, said cutting edges being so related so that each scraper surfaces a little deeper than the preceding scraper.

5. A film squaring and scraping machine comprising a film support means for cutting off a film transversely of its length, and a series of aligning, yielding scrapers having their cutting edges so related that each scraper surfaces a little deeper in the film than the preceding scraper.

CAMILLE A. SENTOU.
ETIENNE JACQUET.